United States Patent [19]

Koishi et al.

[11] Patent Number: 4,679,860
[45] Date of Patent: Jul. 14, 1987

[54] WHEEL ASSEMBLY FOR VEHICLE

[75] Inventors: Masaru Koishi, Niiza; Haruo Shinohara, Kawagoe; Shinji Takayanagi, Wako, all of Japan

[73] Assignee: Honda Giken Kogyo Kabushiki Kaisha, Japan

[21] Appl. No.: 804,272

[22] Filed: Dec. 3, 1985

[30] Foreign Application Priority Data

Dec. 21, 1984 [JP] Japan ............................ 59-194030[U]

[51] Int. Cl.⁴ .......................... B60B 3/16; B60B 23/10
[52] U.S. Cl. ................................ 301/9 DN; 301/11 S; 301/11 CD; 301/35 R
[58] Field of Search ................ 301/9 DN, 11 R, 11 S, 301/11 CD, 14, 19, 35 R

[56] References Cited

U.S. PATENT DOCUMENTS 1,761,928 6/1930 Main ...................................... 301/19
1,769,219 7/1930 Gillam ................................... 301/19
1,988,509 1/1935 Prescott ........................... 301/11 CD
2,118,694 5/1938 Ash ................................... 301/9 DN
2,134,419 10/1938 Sinclair ............................ 301/9 DN Primary Examiner—David A. Scherbel
Attorney, Agent, or Firm—Darby & Darby

[57] ABSTRACT

A wheel assembly for a vehicle includes a hub including a tubular body and a radial flange formed around an outer peripheral surface of the hub body and having opposite radial faces, and a separate rim including an annular body disposed coaxially with the hub body and a radial flange formed around an inner peripheral surface of the rim body and having opposite radial faces, the hub flange and the rim flange being mated together at their one radial faces and releasably fastened together by fastening means. A projection is provided on the hub flange and extends generally radially outwardly of that portion of the inner peripheral surface of the rim body disposed adjacent to the other radial face of the rim flange. The distance between a radial outer end of the projection means and the one radial face of the hub flange is less than the distance between the other radial face of the rim flange and an axial outer end of said that portion remote from the other radial face of the rim flange, thereby preventing the rim for being fastened to the hub reversely.

1 Claim, 5 Drawing Figures

WHEEL ASSEMBLY FOR VEHICLE

BACKGROUND OF THE INVENTION

1. Field of the Invention

This invention relates to a wheel assembly for vehicles which comprises a hub and a separate rim joined to the hub by fastening means such as a bolt-and-nut arrangement.

2. Prior Art

FIG. 1 shows one conventional wheel assembly 10 of the type described above which comprises a hub 12 including a tubular body 12a and a radial flange 14 formed around the outer peripheral surface of the hub body 12a, and a rim 16 including an annular body 16a disposed coaxially with the hub body 12a and a radial flange 18 formed around the inner peripheral surface of the rim body 16a. The hub 12 is adapted to be fitted on an axle of the vehicle such as a motorcycle through a pair of bearings 13 and 13, and a tire 17 is adapted to be fitted in the rim body 16a. The hub flange 14 and the rim flange 18 are mated with each other at their one radial faces and joined together by a plurality of pairs of bolts 20 and nuts 22 to fix the rim 16 with respect to the hub 12. The rim 16 is composed of two parts welded together. The rim body 16a has a central portion 16b of a reduced diameter where the rim flange 18 is disposed. The outer diameter of the hub flange 14 is slightly less than the inner diameter of the central portion 16b of the rim body 16a. For assembling the wheel assembly 10, the hub 12 is inserted into the rim 16 from a left-hand side thereof (FIG. 1) until the hub flange 14 is brought into contact with the rim flange 18. Since the outer diameter of the hub flange 14 is slightly less than the inner diameter of the reduced diameter portion 16b, it is possible that the hub 12 is inadvertently inserted into the rim 16 from a right-hand side thereof (FIG. 1) until the hub flange 14 is brought into engagement with the rim flange 18, as shown in FIG. 2. Thus, the hub 12 and the rim 14 can be fixed with respect to each other in a reverse manner. Therefore, each time the wheel assembly 10 is assembled, extreme care must be exerted so that the wheel assembly 10 may not be assembled reversely. Thus, the assembling of the wheel assembly 10 can not be carried out efficiently. The problem of this reverse assembling is undesirable particularly where the tire 17 has a directionality because the performance of the tire 17 is not fully achieved during use in the event of such reverse assembling. Also, in the case where the wheel assembly 10 is designed to be mounted on a motorcycle with a median plane C1 thereof being offset from a median plane C2 of the motorcycle body in a left-hand direction (FIG. 1), the median plane C1 is offset from the median plane C2 in the opposite direction, that is, in a right-hand direction (FIG. 2) if the reversely-assembled wheel assembly 10 is mounted on the motorcycle. This is apparently undesirable.

SUMMARY OF THE INVENTION

It is therefore an object of this invention to provide a wheel assembly in which a hub and a separate rim are properly assembled together without fail.

According to the present invention, there is provided a wheel assembly for a vehicle which comprises:

(a) a hub including a tubular body and a radial flange formed around an outer peripheral surface of said hub body and having opposite radial faces;

(b) a separate rim including an annular body disposed coaxially with said hub body and a radial flange formed around an inner peripheral surface of said rim body and having opposite radial faces, said hub flange and said rim flange being mated together at their one radial faces, (c) fastening means releasably connecting said hub flange and said rim flange together to fix said rim with respect to said hub; and (d) a projection means provided on said hub flange and extending generally radially outwardly of that portion of the inner peripheral surface of said rim body disposed adjacent to the other radial face of said rim flange, the distance between a radial outer end of said projection means and the one radial face of said hub flange being less than the distance between the other radial face of said rim flange and an axial outer end of said that portion remote from the other radial face of said rim flange.

DESCRIPTION OF THE PREFERRED EMBODIMENTS OF THE INVENTION

Figure 1:
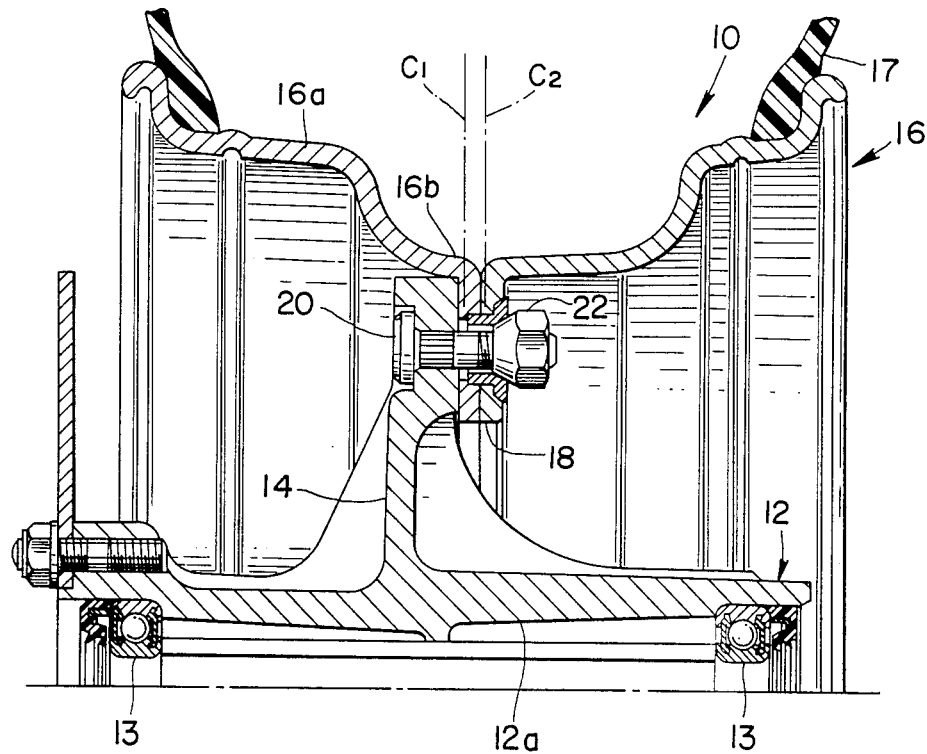
FIG. 1 is a cross-sectional view of a portion of a wheel assembly provided in accordance with the prior art.
Figure 2:
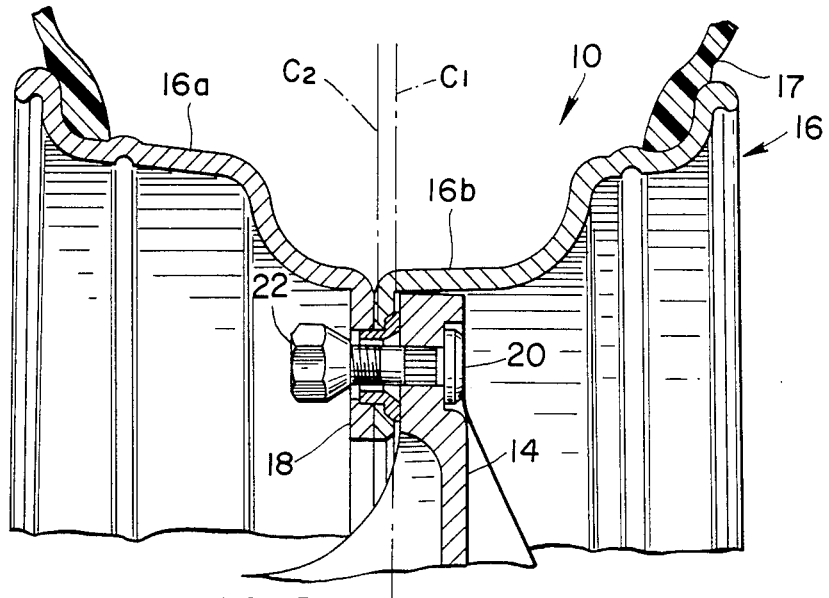
FIG. 2 is a view similar to FIG. 1 but showing a rim attached to a hub reversely.

The invention will now be described with reference to the drawings in which like reference numerals denote corresponding parts in several views.

A wheel assembly 30 comprises a hub 12 including a tubular body 12a and a radial flange 14 formed around the outer peripheral surface of the hub body 12a and thickened at a radial outer portion thereof, and a rim 16 including an annular body 16a disposed coaxially with the hub body 12a and a radial flange 18 of a uniform thickness formed around the inner peripheral surface of the rim body 16a. The hub 12 is adapted to be fitted on an axle of a vehicle such as a motorcycle through a pair of bearings 13 and 13, and a tire 17 is adapted to be fitted in the rim body 16a. The rim 16 is composed of two parts welded together. The hub flange 14 and the rim flange 18 are mated with each other at their one radial faces 14a and 18a and joined together by a plurality of pairs of bolts 20 and nuts 22 to fix the hub 12 with respect to the rim 16. More specifically, the hub flange 14 has a plurality of circumferentially-spaced apertures 26 formed therethrough while the rim flange 18 has a plurality of circumferentially-spaced apertures 28 formed therethrough, the apertures 26 being aligned with the apertures 28, respectively. A plurality of bushings 30 are fitted in the apertures 28. The bolts 20 are passed through the respective aligned apertures 26 and 28, and the nuts 22 are threaded on the distal ends of the bolts 22, respectively, each bolt 20 with a spline 20b being press fitted in a respective one of the apertures 26. The internal bore of each bushing 30 is progressively increasing in diameter at one end thereof remote from the hub flange 14 to provide a seat 30a. Each of the nuts 22 has a tapered portion 22a which is held in engagement with a respective one of the seats 30a. A reference numeral 31 designates a disk of a disk brake.

The rim body 16a is reduced in diameter at its central portion, and the rim flange 18 is disposed at this central portion. More specifically, the rim body 16b has a pair of first and second reduced-diameter portions 32a and 32b of substantially the same diameter disposed adjacent to and on opposite sides of the rim flange 18, respectively. The outer diameter of the hub flange 14 is slightly less than the inner diameter of the second reduced-diameter portion 32b of the rim body 16a, so that the peripheral surface of the hub flange 14 is disposed in contiguous relation to the inner peripheral surface of the second reduced-diameter portion 32b.

The hub flange 14 has an annular projection 34 formed on the peripheral surface thereof at one marginal portion thereof remote from the rim flange 18. The axial length L1 of the first reduced-diameter portion 32a of the rim body 16a, that is to say, the distance between the other radial face 18b of the rim flange 18 and an axial outer end 19 of the first reduced-diameter portion 32a, is greater than a distance L2 between the one face 14a of the hub flange 14 and the annular projection 34. The outer diameter D2 of the annular projection 34 is greater than the inner diameter D1 of the first reduced-diameter portion 32a of the rim body 16a.

Figure 4:
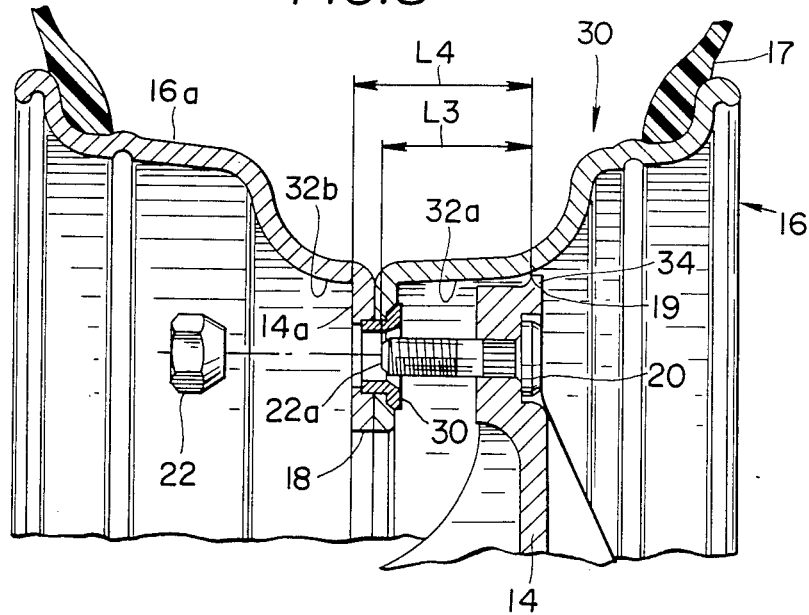
FIG. 4 a view similar to FIG. 3 but showing a rim disposed reversely relative to a hub.

With this construction, when the hub 12 is inserted into the rim 16 reversely, that is, from the right-hand side (FIG. 4) so as to join the hub 12 and the rim 16 together, the annular projection 34 is brought into engagement with the axial outer end 19 of the first reduced-diameter portion 32a of the rim body 16 since the outer diameter D2 of the annular projection 34 is greater than the inner diameter D1 of the first reduced-diameter portion 32a as described above. Therefore, the hub flange 14 can not be brought into contact with the rim flange 18. In addition, as shown in FIG. 4, since the distance L3 between the annular projection 34 and the distal end 20a of each bolt 20 is less than the distance L4 between the axial outer end 19 of the first reduced-diameter portion 32a and the one face 18a of the rim flange 18, the hub flange 14 and the rim flange 18 can not be fastened together by the bolts 20 and the nuts 22. Therefore, an incorrect assembling of the wheel assembly 30 is positively prevented.

The annular projection 34 may be interrupted at predetermined intervals to provide a plurality of circumferentially spaced projections.

Figure 3:
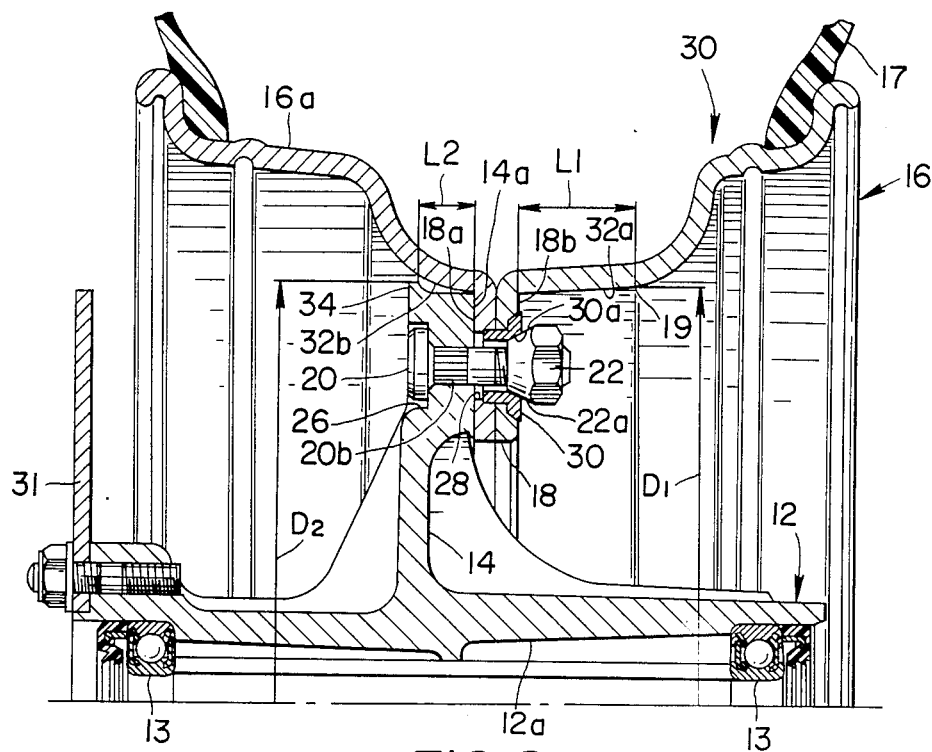
FIG. 3 is a cross-sectional view of a portion of a wheel assembly provided in accordance with the present invention.
Figure 5:
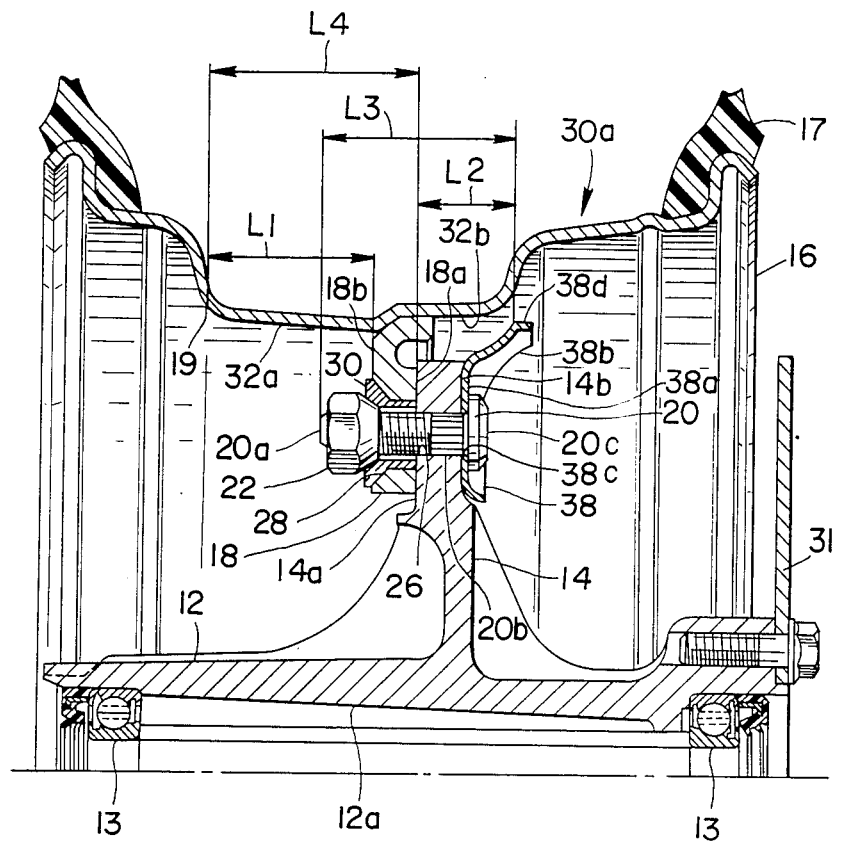
FIG. 5 is a view similar to FIG. 3 but showing a modified wheel assembly.

FIG. 5 shows a modified wheel assembly 30a which differs from the wheel assembly 30 of FIG. 3 mainly in that a plurality of washers 38 replace the annular projection 34. More specifically, a hub flange 14 and a rim flange 18 are mated together with their one radial faces 14a and 18a and joined together by bolts 20 and nuts 22 as described above for the preceding embodiment. Each washer 38 includes a circular base 38a and a projection 38b extending generally radially outwardly from the circular base 38a. The washer base 38a is held against the other face 14b of the hub flange 14. The washer 38 is fixedly secured to the hub flange 14 by the bolt 20 having a spline 20b which bolt is press fitted into an aperture 26 of the hub flange 14 and an aperture 38c of the washer 38 with the washer base 38a held between the head 20b of the bolt 20 and the other face 14b of the hub flange 14, thereby holding the washer 38 against movement with respect to the hub flange 14. Each washer 38 is fixed to the hub flange 14 before the hub 12 and the rim 16 are connected together.

The radial outer end 38d of the projection 38b of the washer 38 is disposed radially outwardly of an inner peripheral surface of a first reduced-diameter portion 32a. The axial length L1 of the first reduced-diameter portion 32a, that is to say, the distance between the other face 18b of the rim flange 18 and the axial outer end 19 of the first reduced-diameter portion 32a, is greater than the distance L2 between the radial outer end 38d of the projection 38b and the one face 14a of the hub flange 14. In addition, since the distance L3 between the radial outer end 38d and the distal end 20a of each bolt 20 is less than the distance between the axial outer end 19 of the first reduced-diameter portion 32a and the one face 18a of the rim flange 18, the hub flange 14 and the rim flange 18 can not be fastened together by the bolts 20 and the nuts 22. Therefore, an incorrect assembling of the wheel assembly 30 is positively prevented.

What is claimed is:

1. A wheel assembly for a vehicle comprising:
   a hub including a tubular body and a radial flange formed around an outer peripheral surface of said hub body and having opposite radial faces;
   (b) a separate rim including an annular body disposed coaxially with said hub body and a radial flange formed around an inner peripheral surface of said rim body and having opposite radial faces, said hub flange and said rim flange being mated together at their one radial faces,
   (c) fastening means releasably connecting said hub flange and said rim flange together to fix said rim with respect to said hub, said fastening means comprising a plurality of bolts each passing through said mated rim and hub flanges in circumferentially spaced relation, and a plurality of nuts each threaded on a distal end of a respective one of said bolts, there being provided a plurality of washers each mated with and fixedly secured to the other radial face of said hub flange by said bolts passing through said washers, each washer including a base and a projection extending generally radially outwardly from said base so as to serve as said projection means; and
   (d) projection means provided on said hub flange and extending generally radially outwardly of that portion of the inner peripheral surface of said rim body disposed adjacent to the other radial face of said rim flange, the distance between a radial outer end of said projection means and the one radial face of said hub flange being less than the distance between the other radial face of said rim flange and an axial outer end of said that portion remote from the other radial face of said rim flange, said projection means comprising a plurality of projections spaced circumferentially of said hub flange.

* * * * *